US012700639B2

(12) United States Patent
Favaretto

(10) Patent No.: US 12,700,639 B2
(45) Date of Patent: Aug. 4, 2026

(54) VEHICULAR BATTERY PACK AND RELATED ASSEMBLY METHOD

(71) Applicant: FERRARI S.P.A., Modena (IT)

(72) Inventor: Fabrizio Favaretto, Modena (IT)

(73) Assignee: FERRARI S.P.A., Modena (IT)

( * ) Notice: Subject to any disclaimer, the term of this patent is extended or adjusted under 35 U.S.C. 154(b) by 331 days.

(21) Appl. No.: 18/608,173

(22) Filed: Mar. 18, 2024

(65) Prior Publication Data

US 2024/0322347 A1     Sep. 26, 2024

(30) Foreign Application Priority Data

Mar. 21, 2023     (IT) ........................ 102023000005253

(51) Int. Cl.
| | |
|---|---|
| *H01M 50/291* | (2021.01) |
| *B60K 1/04* | (2019.01) |
| *H01M 50/213* | (2021.01) |
| *H01M 50/249* | (2021.01) |
| *B60L 50/60* | (2019.01) |

(Continued)

(52) U.S. Cl.
CPC ............. *H01M 50/291* (2021.01); *B60K 1/04* (2013.01); *H01M 50/213* (2021.01); *H01M 50/249* (2021.01); *B60K 2001/0416* (2013.01); *B60K 2001/0438* (2013.01); *B60L 50/64* (2019.02); *B60L 50/66* (2019.02); *H01M 50/107* (2021.01); *H01M 2220/20* (2013.01)

(58) Field of Classification Search
CPC ............. H01M 50/291; H01M 50/289; H01M 50/213; H01M 50/249; H01M 50/107; H01M 2220/20; B60K 1/04; B60K 2001/0416; B60K 2001/0438; B60L 50/64; B60L 50/66

See application file for complete search history.

(56) References Cited

U.S. PATENT DOCUMENTS

| | | | | |
|---|---|---|---|---|
| 2005/0217910 | A1* | 10/2005 | Yonehana | ................ B62M 7/12 |
| | | | | 180/68.5 |
| 2017/0288286 | A1* | 10/2017 | Buckhout | ........... H01M 50/519 |

(Continued)

FOREIGN PATENT DOCUMENTS

| | | | | |
|---|---|---|---|---|
| DE | 102011001371 A1 | * | 9/2012 | ......... H01M 50/249 |
| FR | 2868387 A1 | | 10/2005 | |

OTHER PUBLICATIONS

Italian Search Report for Application No. 202300005253; Filing Date: Mar. 21, 2023; Date of Mailing: Oct. 9, 2023; 7 pages.

*Primary Examiner* — Timothy Hannon
(74) *Attorney, Agent, or Firm* — CANTOR COLBURN LLP

(57) ABSTRACT

A vehicular battery pack comprising a floor configured to define, at least in part, a floor pan of a road vehicle; cylindrical electrochemical cells, electrically connected to each other and arranged on the inner surface of the floor; each of the cylindrical electrochemical cells comprises a lateral surface having a circular cross-section extending along an axis of symmetry; the floor of the support structure has an at least partially curved conformation, which deflects distancing itself from the ground along the longitudinal axis in a direction opposite a normal travel direction of the road vehicle; wherein said electrochemical cells are arranged with said respective lateral surface in contact with the inner surface of the floor.

13 Claims, 4 Drawing Sheets

(51) Int. Cl.
*B60L 50/64*          (2019.01)
*H01M 50/107*       (2021.01)

(56)               References Cited

U.S. PATENT DOCUMENTS

| | | |
|---|---|---|
| 2020/0207201 A1 | 7/2020 | Favaretto |
| 2022/0223960 A1 | 7/2022 | Boehm et al. |
| 2024/0079701 A1* | 3/2024 | Jiang .................. H02K 11/0094 |

* cited by examiner

VEHICULAR BATTERY PACK AND RELATED ASSEMBLY METHOD

CROSS-REFERENCE TO RELATED APPLICATIONS

This patent application claims priority from Italian patent application no. 102023000005253 filed on Mar. 21, 2023, the entire disclosure of which is incorporated herein by reference.

TECHNICAL FIELD

The present invention refers to the field of the energy storage systems in the automotive sector and relates to a vehicular battery pack and to a related assembly method.

In particular, the present invention is advantageously, but not exclusively applied to battery packs for high-performance road vehicles, to which the following description will explicitly refer without thereby losing generality.

PRIOR ART

Lithium batteries in relation to their high energy density increasingly allow the implementation of the electric power in the automotive sector. Lithium polymers, in particular, currently represent, from the electrochemical point of view, the state of the art in the production of high-capacity batteries.

Solutions are known which provide for the interconnection in series and in parallel of several cells (generally, each one of 3.7 V) for reaching the target total voltage and energy density for a vehicular battery pack.

Various types of vehicular battery packs are known mainly comprising cylindrical or planar (prismatic or pocketed, so-called pouch) batteries.

The batteries are generally anchored to the floor (floor pan) of the vehicle. In some cases, the batteries are housed in the same floor pan, in other cases, they are arranged in place of a traditional heat power train assembly.

Patent document EP3674122 describes a battery pack in which the battery modules are made of a plurality of cylindrical batteries arranged parallel to each other and with their longitudinal axis (i.e. the axis of rotation around which the jelly-roll forming the cylindrical cell of each battery is formed) perpendicular to the floor pan.

Alternatively, the battery modules usually available on the market (not only the automotive market, but also the consumer electronics market) often consist of planar pouch batteries, which have a very limited thickness with respect to the other dimensions. Two very wide opposite faces (through which the heat is almost integrally dissipated) are identified and four thin elongated sides are identified, wherein on one or on two opposite sides, the positive and negative terminals of the cell are arranged.

In any case, the battery packs according to the prior art are configured to have the lower surface flat, and hence the batteries contained therein direct to the ground a flat surface (for example one of the main faces of the planar batteries or the base of the cylindrical batteries).

For high-performance vehicles, it is preferable to have a conformation of the lower part of the chassis of the vehicle such to satisfy predetermined mechanical and aerodynamic requirements.

In accordance with what described by European patent EP3674122, road vehicles are known comprising a floor pan divided into two planar portions, a front one and a rear one, joined transversally, wherein the front portion is parallel to the ground and the rear portion determines a progressive moving away from the ground towards the rear of the road vehicle. In particular, the front planar portion and the rear planar portion are inclined with respect to each other by an angle less than 5°.

However, the presence of such angle causes disadvantages from the aerodynamic point of view. In particular, the angle of the floor pan represents an unevenness which leads the fluid vein to detach from the bottom of the vehicle, thus reducing the rear aerodynamic load (contrary to what desired).

Simultaneously, though, the planarity of the floor pan is made necessary by the presence of the battery modules, which are usually provided with planar surfaces and, in order to prevent wasting large amounts of space, need a planar support.

The need is thus felt to optimize the aerodynamics of the road vehicle without wasting useful space for the batteries.

Document FR2868387A1 describes a moped having electric propulsion which operates utilizing a battery provided with a plurality of cylindrical cells.

Document US2020207201A1 describes an electric or hybrid sports car which comprises a battery pack which incorporates at least one structural element of the chassis of the vehicle, wherein such structural element can be removed from the chassis of the vehicle only together with the battery pack.

DESCRIPTION OF THE INVENTION

The object of the present invention is to provide a vehicular battery pack and a related assembly method, and a related vehicle which are at least partially exempt from the drawbacks described above and, simultaneously, are simple and cost-effective to fabricate.

According to the present invention, a vehicular battery pack and a related assembly method, and a related vehicle are provided according to what claimed in the following independent claims and, preferably, in any one of the claims directly or indirectly dependent on the independent claims. The claims describe preferred embodiments of the present invention forming integral part of the present description.

BRIEF DESCRIPTION OF THE DRAWINGS

The present invention will now be described with reference to the accompanying drawings, which illustrate some non-limiting example embodiments thereof, wherein.

PREFERRED EMBODIMENTS OF THE INVENTION

Figure 1:
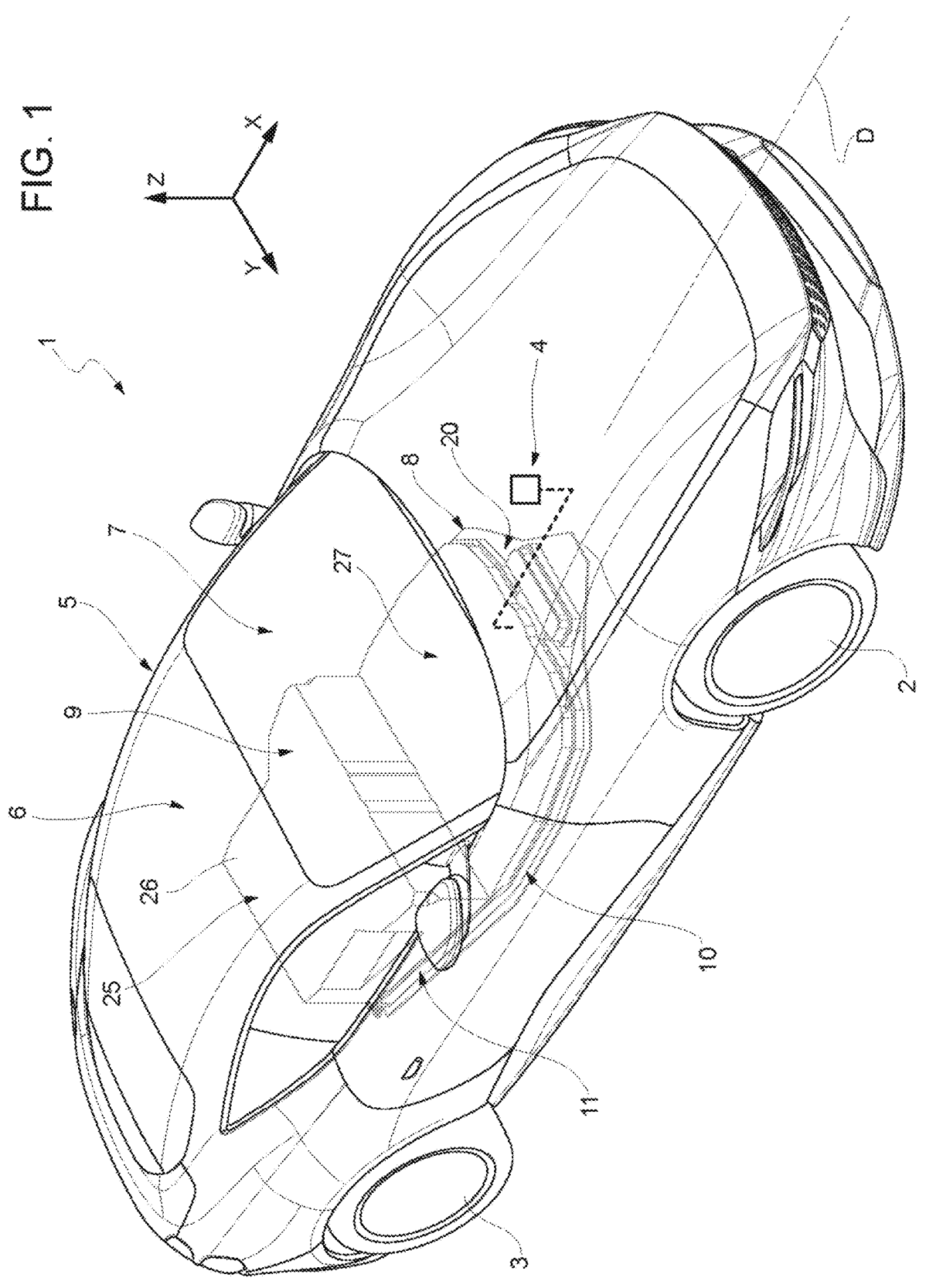
FIG. 1 is a schematic perspective view of a vehicle having an at least partially electric propulsion comprising a battery pack in accordance with the present invention.

In FIG. 1, reference numeral 1 indicates, as a whole, a road vehicle provided with two front wheels 2 and two rear wheels 3, of which at least one pair (or all) receive the torque from a power train 4.

The road vehicle 1 is a vehicle having an at least partially electric propulsion (i.e. hybrid or completely electric). In other words, the power train 4 can be hybrid (i.e. comprises an internal combustion heat engine and at least one electric motor), or electric (i.e. comprises only one or more electric motors).

The same reference numerals and letters in the figures identify the same elements or components with the same function.

Within the scope of the present description the term "second" component does not imply the presence of a "first" component. Such terms, in fact, are used as labels for improving the clarity and are not to be understood in a limiting manner.

The elements and the characteristics illustrated in the various preferred embodiments, including the drawings, can be combined with one another without thereby departing from the scope of protection of the present application as described in the following.

The road vehicle 1 further comprises a body 5 defining a passenger compartment 6, which is configured to accommodate at least one driver and possibly one or more passengers. The passenger compartment 6 defines at least one driving place 7 for the driver.

It is specified that in the following of the present description, expressions such as "at the top", "inferiorly", "at the front", "at the rear" and the like are utilized with reference to normal travel conditions of the road vehicle 1 along the normal travel direction D.

As is illustrated in the non-limiting embodiment of FIG. 1, it is further possible to define:

a longitudinal axis X, integral with the vehicle 1 and arranged, in use, horizontal and parallel to a normal travel direction D of the vehicle 1;

a transversal axis Y, integral with the vehicle 1 and arranged, in use, horizontal and orthogonal to the axis X; and a vertical axis z, integral with the vehicle 1 and arranged, in use, vertical and orthogonal to the axes X, Y.

The road vehicle 1 comprises a vehicular chassis 8, which supports the body 5.

Furthermore, the road vehicle 1 comprises a vehicular battery pack 9 mounted on the chassis 8 and arranged so as to define at least part of a floor pan 10 of the road vehicle 1.

In the non-limiting embodiments of the accompanying figures, the vehicular battery pack 9 comprises a support structure 11 extending along the vehicular longitudinal axis X and comprising a floor 12, which defines, at least in part, the floor pan of the road vehicle 1.

Advantageously but not limitedly, the floor 12 substantially extends between a front axle (of known type and not illustrated) and a rear axle (also of known type and not illustrated) of the road vehicle 1.

Figure 2:
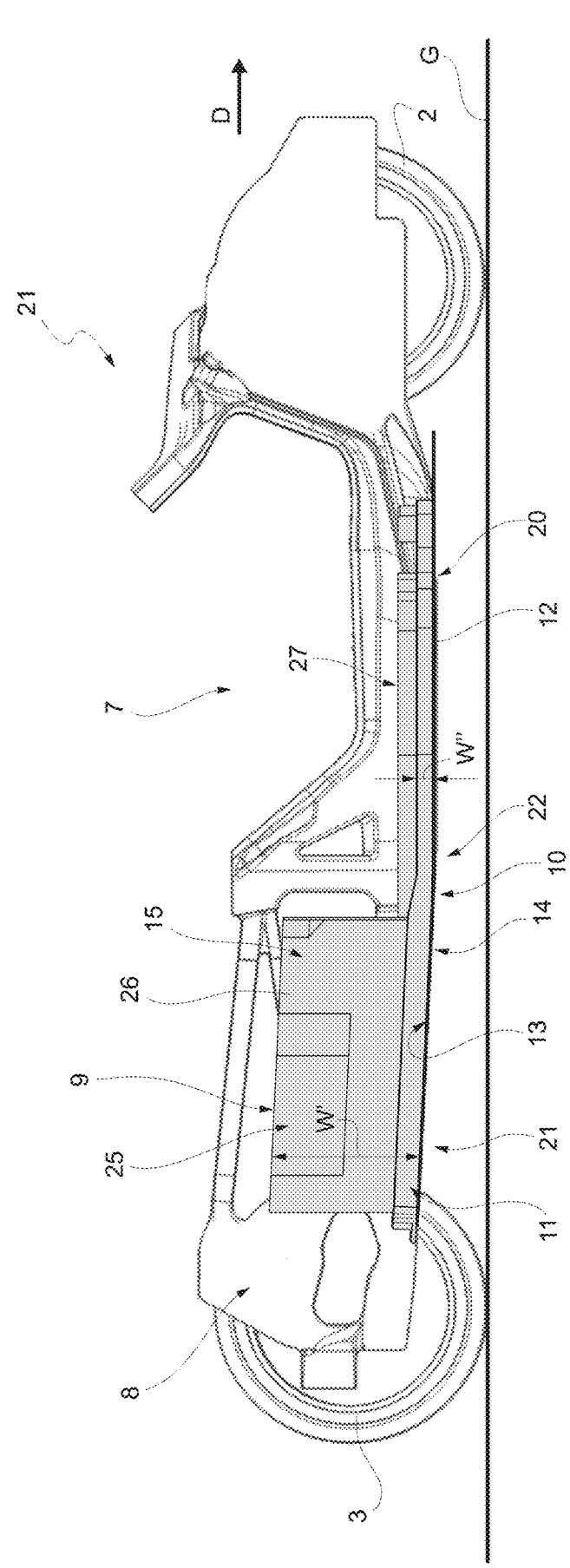
FIG. 2 is a schematic side view of part of the vehicle of FIG. 1.
Figure 3:
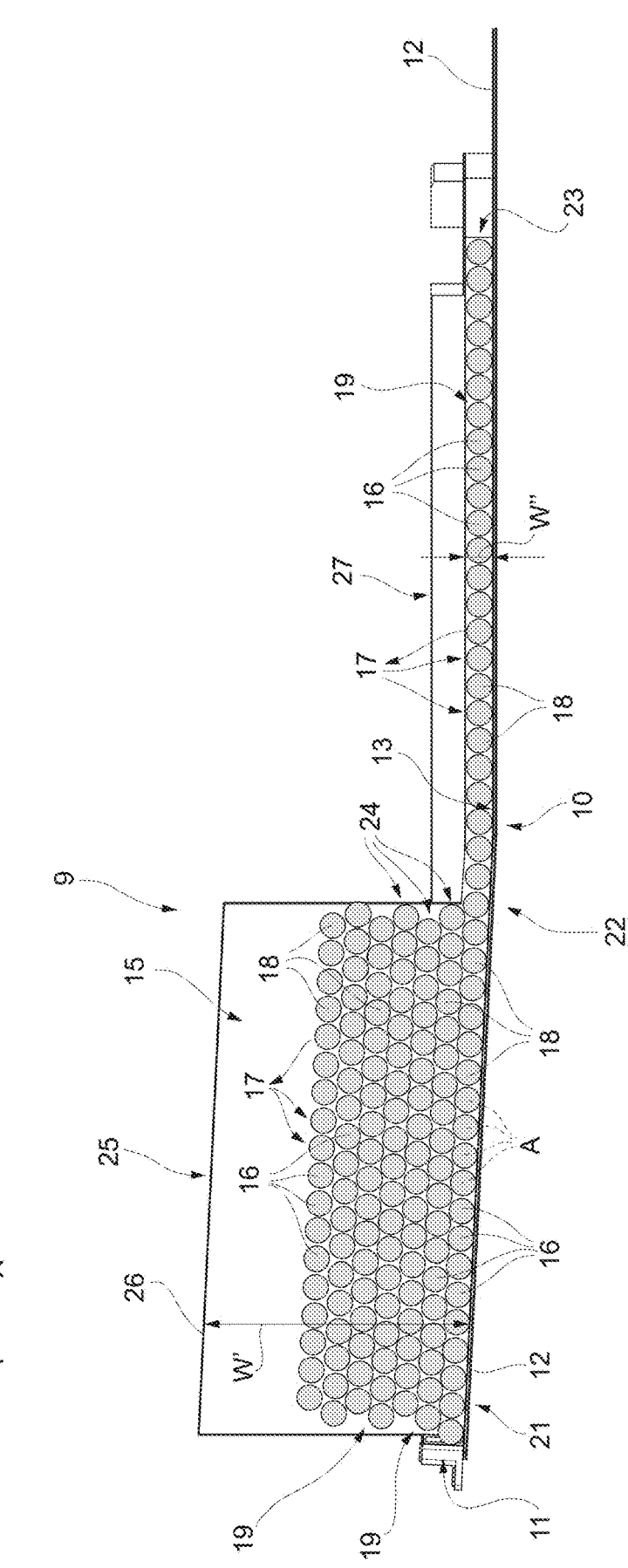
FIG. 3 is a schematic side section view of the battery pack of the vehicle of FIGS. 1 and 2.

As is illustrated in the non-limiting embodiments of FIGS. 2 and 3, the floor 12 has a board-like conformation (i.e. plate-like, with the thickness remarkably less than the other two dimensions) comprising an inner surface 13 and an outer surface 14, opposite the inner surface 13 and configured to be externally exposed so as to face the ground G.

In particular, the support structure 11 defines within it a housing 15, which is limited inferiorly by the floor 12.

The battery pack 9 further comprises cylindrical electrochemical cells 16, electrically connected to each other and arranged internally on the inner surface 13 of the housing 15.

Figure 4:
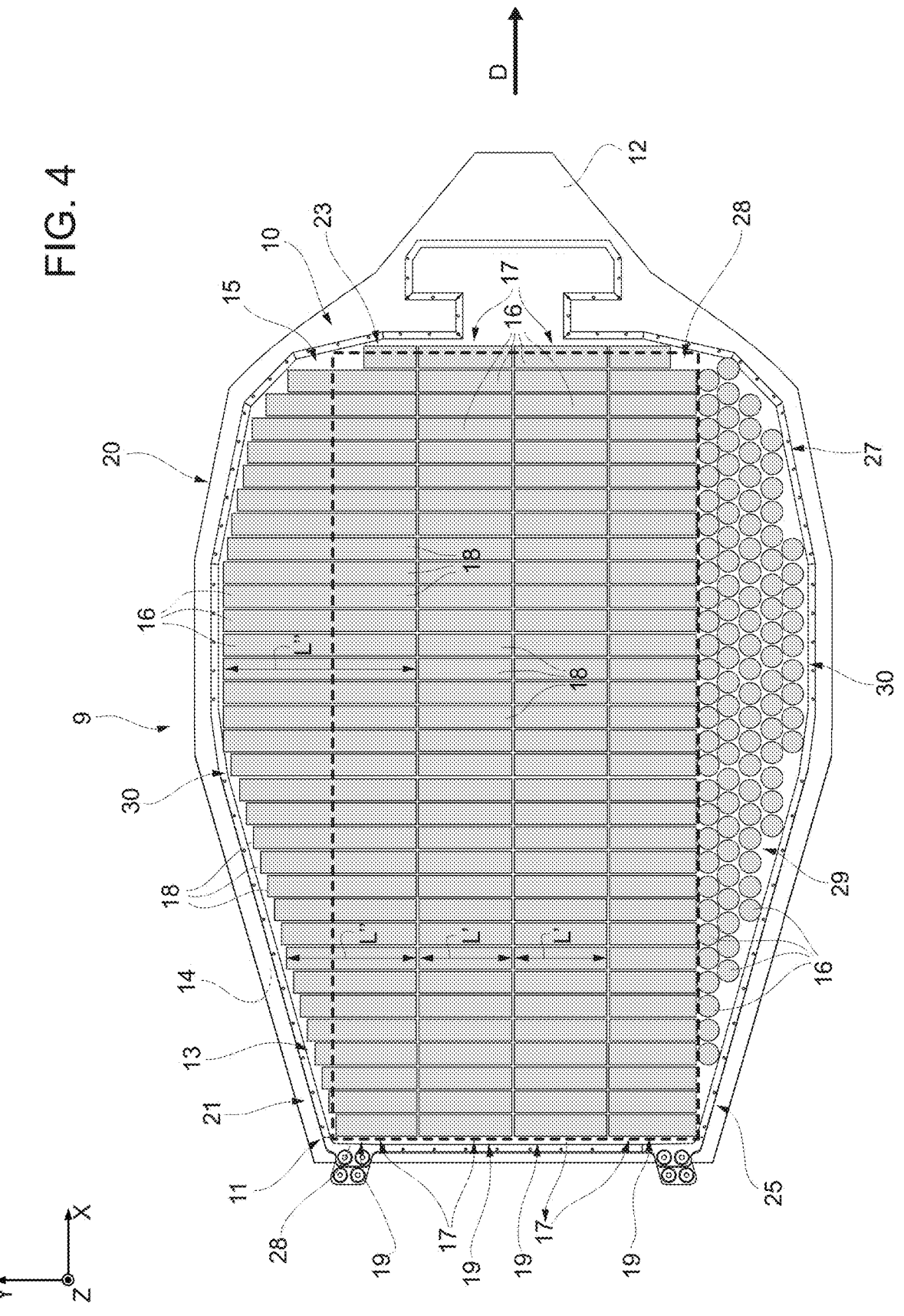
FIG. 4 is a schematic plan view of the battery pack of FIG. 3.

Specifically, as is highlighted by FIGS. 3 and 4, each of the cylindrical electrochemical cells 16 comprises a lateral surface 17 having a circular cross-section extending along an axis A of symmetry and two planar bases 18, which are crossed by said axis A of symmetry.

The cylindrical electrochemical cells 16 are of known type, for example of the lithium ion type, and will not be further specifically described in the following, since they are made with known methodologies.

Advantageously, the floor 12 of the support structure 11 has an at least partially curved conformation, which deflects distancing itself from the ground G along the longitudinal axis X in a direction opposite the normal travel direction D of the road vehicle 1. In such manner, an aerodynamic downforce is generated which enables increasing the rear load of the road vehicle 1. Specifically, the at least partially curved conformation enables leaving the fluid vein adherent to the floor 12 without detachments (unlike what occurs with the prior art angled structures). This leads to a decrease in the aerodynamic drag of the floor 12 and thus to an increase in the lift-to-drag ratio (given, as is known, by the ratio of load to drag).

Advantageously, in order to optimize the use of the space despite the curved geometry of the floor 12 of the battery pack 9, the cylindrical electrochemical cells 16 are (at least in part) arranged side by side and with the respective axes A of symmetry parallel to each other (in particular horizontal).

Advantageously, the electrochemical cells 16 are arranged with the respective lateral surface 17 in contact with the inner surface 13 of the floor 12, so as to form one or more strips 19 of electrochemical cells parallel both to each other, and to the curved conformation, i.e. to the profile, of the floor 12 of the support structure 11, i.e. of the inner surface 13.

In particular, not limitedly, the floor 12 has a constant thickness.

In the non-limiting embodiment of FIGS. 2 and 3, the floor 12 comprises, along the longitudinal axis X, a front portion 20 substantially parallel to the ground G and a rear portion 21 diverging from the ground G, both planar, which are connected by a curved portion 22.

Advantageously but not necessarily, the one or more strips 19 of parallel electrochemical cells extend from the front portion 20 to the rear portion 21, and have at least the lateral surface 17 of one electrochemical cell 16 in contact with the curved portion 22. In other words, the axes A of the electrochemical cells 16 arranged in contact with the inner surface 13, if interpolated, form an approximation of a plane parallel to the floor 12 (at a distance, obviously, equal to the radius of the planar bases 18, which are circular). In such manner, despite the curved portion 22 of the floor 12, the quantity of cells 16 resting on the floor 12 is maximized, without the wastes of space which instead there would be with cells 16 arranged vertically, as is known. In particular, the curved portion 22 enables advantages of aerodynamic type, reducing some turbulent motions under the road vehicle 1.

Preferably but not limitedly, the battery pack 9 comprises a plurality of strips 19 of cells 16 parallel to each other, which form a first layer 23 covering at least for the most part the available inner surface 13 of the floor 12 (some portions of the floor 12 could be occupied by structural elements such as side members and/or cross members of known type).

In the non-limiting embodiment of FIG. 3 a strip 19 is illustrated in cross-section which extends seamlessly for at least 70% of the length of the floor 12.

According to some preferred but non-limiting embodiments, such as the one illustrated in FIGS. 2 and 3, the battery pack 9 comprises further layers 24 of strips 19 of electrochemical cells 16 at least partially overlapping the first layer 23. In particular, the cells of the further layers 24 are arranged so as to form a quincunx formation with the cylindrical cells 16 of the first layer 23. In other words, the cells 16 of the further layers 24 overlap in a staggered manner (by half a cell 16) with respect to the lower layer. In such manner, the quantity of cylindrical cells 16 is maximized, the volume being equal.

Preferably, and as is illustrated in the non-limiting embodiment of FIG. 3, the battery pack 9 comprises a verticalized portion 25, supported by the rear portion 21 and having a thickness W' greater than the rest of the battery pack 9. In particular, the verticalized portion 25 comprises at least three, in particular at least five further overlapping layers 24.

In the embodiment of FIG. 3, the verticalized portion 25 comprises a parallelepiped case 26, which protrudes from the rest of the battery pack 9. In particular, the parallelepiped case 26, due to the inclination with respect to the ground G of the rear portion 21, has a parallelogram cross-section along the plane ZX (i.e. the plane on which the axes Z and X lie), whereas it has a rectangular cross-section on the plane ZY (i.e. the plane on which the axes Z and Y lie). The verticality of the verticalized portion 25 enables remarkably expanding the capacity of the battery pack 9.

Advantageously but not necessarily, the battery pack 9 further comprises a lowered portion 27, supported by the front portion 20 and having a thickness W" less than the verticalized portion 25.

In particular, in the lowered portion 27 only the first layer 23 of strips 19 of cells 16 is present. Alternatively, in the lowered portion 27 only the first layer 23 of strips 19 of cells 16 and a single further layer 24 overlapping it are present.

In order to optimize the spaces, given the inferiorly and laterally curved geometry of the battery pack 9, various embodiments are possible.

In some non-limiting cases, the cells 16 of a first strip 19 of the plurality of strips have length L', along the longitudinal axis, different from a length L" of the cells 16 of a second strip 19 of the plurality of strips 19, as is illustrated in the non-limiting embodiment of FIG. 4.

Alternatively or additionally, the cylindrical cells 16 of a same strip 19 have different lengths L', L", as is illustrated in the non-limiting embodiment of FIG. 4. In particular, the cylindrical cells 16 having different lengths L', L" are arranged to have, each, one of the two planar bases 18 of each of the cells on a same feed plane ZX. In such manner, it will be simpler to connect to each other at least the terminals of the cells 16 on the same plane ZX.

In further non-limiting cases, as is partially schematically illustrated in FIG. 4, the battery pack 9 also comprises cylindrical cells 16 with vertical axis A of symmetry, orthogonal to the inner surface 13. In particular, the battery pack 9, in a plan view, as the one schematically illustrated in FIG. 4, comprises a central rectangular zone 28 filled by means of cells 16 arranged horizontally and a peripheral amorphous zone 29 filled with cells 16 arranged vertically, so as to be able to anyway vertically arrange the lateral surface 17 of the cells 16 (illustrated at the bottom in FIG. 4) in contact with the curved geometry of the sides 30 of the battery pack 9.

In particular, the battery pack 9 is arranged inferiorly the passenger compartment 6. In particular, the front portion 20 is arranged under the driving place 7 and the possible passenger place next to it, whereas the rear portion 21 is arranged behind the seats contained inside the passenger compartment 6.

In particular, the battery pack 9 is suitable for being connected to the power train 4 of the vehicle 1 having an at least partially electric propulsion and is adapted to accumulate the electric energy produced by an electric machine (not illustrated). The battery pack 9 is connected to the electric machine by means of the interposition of an electric energy converter (commonly known as inverter) which, on the basis of the different needs of the electric machine and of the battery pack 9 transforms the direct current exiting the battery pack 9 into alternating current for the electric machine, and vice versa.

The battery pack 9 comprises at least one section configured to house a battery control and monitoring system (normally called BMS-"Battery Management System"), adapted to control the operation parameters of the electrochemical cells 16. The ends of the cells C contained in the battery pack 16 are connected to terminals by means of a BUS connection of known type.

According to a further aspect of the present invention, a method of assembling a vehicular battery pack 9 is provided. The method comprises the steps of:

fabricating in metal plate or composite material the support structure 11 extending along the vehicular longitudinal axis X and comprising the floor 12 configured to define, at least in part, the floor pan 10 of the road vehicle 1;

arranging the cylindrical electrochemical cells 16, electrically connected to each other, inside the housing 15, in correspondence with the inner surface 13.

In particular, during the arranging step, the electrochemical cells 16 are arranged with the respective lateral surface 17 in contact with the inner surface 13 of the floor 12, so as to form the one or more strips 19 of electrochemical cells 16 parallel to each other and to the at least partially curved conformation of the floor 12 of the support structure 11.

Preferably, the electrochemical cells 16 are arranged so as to form a first layer 23 covering at least for the most part the available inner surface 13 of the floor 12.

Preferably but not limitedly, the method comprises the further step of arranging the further layers 24 of strips 19 of electrochemical cells 16 at least partially overlapping the first layer 23, in which the cells 16 of the further layers 24 are arranged so as to form the quincunx formation with the cylindrical cells 16 of the first layer.

Advantageously but not limitedly, during the further arranging step, the verticalized portion 25 is formed, supported by the rear portion 21 and having the thickness W' greater than the rest of the battery pack 9. In particular, in the verticalized portion 25, at least three, in particular at least five, further overlapping layers 24 are arranged.

Although the invention described above particularly refers to some very precise example embodiments, it is not to be considered limited to such example embodiments, falling within its scope all the variations, modifications or simplifications covered by the appended claims, such as for example a different shape of the battery pack, a different placing thereof, a different type of materials, etc.

The present invention has many advantages.

Firstly, it allows having sinuous shapes on the bottom of the battery pack on which to rest the lateral surfaces of the cylindrical cells.

Furthermore, the present invention allows improving the lift-to-drag ratio preventing angles on the floor pan which degrade the vehicular aerodynamics making the fluid vein detach.

A further advantage of the present invention lies in the simplicity of the mounting of the battery pack.

Finally, the present invention allows overcoming the geometrical limits currently present in the prior art battery packs, freeing the designers from the concept of a flat vehicular bottom.

LIST OF THE REFERENCE NUMERALS OF THE FIGURES 1 vehicle
2 wheels
3 wheels
4 power train
5 body
6 passenger compartment
7 driving place
8 chassis
9 battery pack
10 floor pan
11 support structure
12 floor
13 inner surface
14 outer surface
15 housing
16 electrochemical cells
17 lateral surface
18 planar bases
19 strips of cells
20 front portion
21 rear portion
22 curved portion
23 first layer
24 further layers
25 verticalized portion
26 parallelepiped case
27 lowered portion
28 rectangular zone
29 amorphous zone
30 sides of the battery pack
A axis of symmetry
D direction
G ground
L' length
L" length
W' thickness 25
W" thickness 27
X axis
Y axis
Z axis

The invention claimed is:

1. A vehicular battery pack (9) comprising:
a support structure (11) extending along a vehicular longitudinal axis (X) and comprising a floor (12) configured to define, at least in part, a floor pan (10) of a road vehicle (1); the floor (12) having a board-like conformation comprising an inner surface (13) and an outer surface (14), opposite the inner surface (13) and configured to be externally exposed so as to face the ground (G); the support structure (11) defining within it a housing (15) limited inferiorly by said floor (12);
cylindrical electrochemical cells (16), electrically connected to each other and arranged internally on the inner surface of said housing; each of the cylindrical electrochemical cells (16) comprises a lateral surface (17) having a circular cross-section extending along an axis (A) of symmetry and two planar bases (18), which are crossed by said axis (A) of symmetry;

the vehicular battery pack (9) being characterised in that the floor (12) of the support structure (11) has an at least partially curved conformation, which deflects distancing itself from the ground (G) along the longitudinal axis (X) in a direction opposite a normal travel direction (D) of the road vehicle (1);
wherein said cylindrical electrochemical cells (16) are at least partially arranged side by side and with their respective axes of symmetry parallel to each other;
wherein said electrochemical cells (16) are arranged with said respective lateral surface (17) in contact with the inner surface (13) of the floor (12), so as to form one or more strips (19) of electrochemical cells (16) parallel to each other and to the at least partially curved conformation of the floor (12) of the support structure (11);
wherein the floor (12) comprises, along the longitudinal axis (X), a front portion (20) substantially parallel to the ground (G) and a rear portion (21) diverging from the ground (G), both planar, which are connected by a curved portion (22); the one or more strips (19) of parallel electrochemical cells (16) extending from the front portion (20) to the rear portion (21), and having at least the lateral surface (17) of one electrochemical cell of the one or more strips (19) in contact with the curved portion (22).

2. The battery pack (9) according to claim 1, and the one or more strips (19) of electrochemical cells (16) comprising a plurality of strips (19) of electrochemical cells (16) parallel to each other, the strips (19) forming a first layer (23) covering at least for the most part the available inner surface (13) of the floor (12).

3. The battery pack (9) according to claim 2 and the plurality of strips (19) comprising further layers (24) of strips (19) of electrochemical cells (16) at least partially overlapping the first layer (23) and whose cells (16) are arranged to form a quincunx formation with the cylindrical cells (16) of the first layer (23).

4. The battery pack (9) according to claim 3, and comprising a verticalized portion (25), supported by the rear portion (21) and having a thickness (W') greater than the rest of the battery pack (9), in which there are at least three, in particular at least five further overlapping layers (24).

5. The battery pack (9) according to claim 4 and comprising a lowered portion (27), supported by the front portion (20) and having a thickness (W") less than the verticalized portion (25), in which the first layer (23) or the first layer (23) with a single further layer (24) overlapping it are present.

6. The battery pack (9) according to claim 2, wherein the cells (16) of a first strip (19) of the plurality of strips (19) have length (L'), along the longitudinal axis (X), different from the cells (16) of a second strip (19) of the plurality of strips (19).

7. The battery pack (9) according to claim 1, wherein the cylindrical cells (16) of a same strip (19) of the one or more strips (19) have different lengths.

8. The battery pack (9) according to claim 7, wherein the cylindrical cells (16) having different lengths are arranged to have, each, one of the two planar bases (18) of each of the cells (16) on a same feed plane.

9. An electric or hybrid road vehicle (1) comprising:
four wheels (2, 3), of which at least one pair of driving wheels (2, 3);
a passenger compartment (6);
a power train configured to control the motion of the driving wheels (2, 3);

the vehicular battery pack (9) according to claim 1 mounted to a chassis of the road vehicle (1) and arranged so as to define at least part of the floor plan (10) of the road vehicle (1).

10. A method of assembling a vehicular battery pack (9) comprising the steps of:

fabricating in metal plate or composite material a support structure (11) extending along a vehicular longitudinal axis (X) and comprising a floor (12) configured to define, at least in part, a floor pan (10) of a road vehicle (1); the floor (12) having a board-like conformation comprising an inner surface (13) and an outer surface (14), opposite the inner surface (13) and configured to be exposed externally so as to face the ground (G); the support structure (11) defining within it a housing (15) limited inferiorly by said floor (12); wherein the floor (12) of the support structure (11) has an at least partially curved conformation, which deflects away from the ground (G) along the longitudinal axis (X) in a direction opposite a normal travel direction (D) of the road vehicle (1);

arranging cylindrical electrochemical cells (16), electrically connected to each other, inside said housing, in correspondence with the inner surface; wherein each of the cylindrical electrochemical cells (16) comprises a lateral surface (17) with circular cross-section extending along an axis (A) of symmetry and two planar bases (18), which are crossed by said axis (A) of symmetry; wherein said cylindrical electrochemical cells (16) are at least partially arranged side by side and with their respective axes of symmetry parallel to each other;

the method being characterised in that, during the arranging step, said electrochemical cells (16) are arranged with said respective lateral surface (17) in contact with the inner surface (13) of the floor (12), so as to form one or more strips (19) of electrochemical cells (16) parallel to each other and to the at least partially curved conformation of the floor (12) of the support structure (11).

11. The method according to claim 10, wherein, during the arranging step, said electrochemical cells (16) are arranged so as to form a first layer (23) covering at least for the most part the available inner surface (13) of the floor (12).

12. The method according to claim 11 and comprising the further step of arranging further layers (24) of strips (19) of electrochemical cells (16) at least partially overlapping the first layer (23) and the cells (16) of which are arranged so as to form a quincunx formation with the cylindrical cells (16) of the first layer (23).

13. The method according to claim 12, wherein, during the further arranging step, a verticalized portion (25) is formed, supported by the rear portion (21) and having a thickness (W') greater than the rest of the battery pack (9); in the verticalized portion (25) at least three, in particular at least five, further overlapping layers (24) are arranged.

\* \* \* \* \*